June 13, 1961 H. WEISS 2,988,650

HALL-EFFECT CONTROL ELEMENT WITH UTILIZATION CIRCUIT

Filed Nov. 10, 1954 3 Sheets-Sheet 1

HALL-EFFECT CONTROL ELEMENT WITH UTILIZATION CIRCUIT

Filed Nov. 10, 1954

3 Sheets-Sheet 2

United States Patent Office 2,988,650

Patented June 13, 1961

2,988,650

HALL-EFFECT CONTROL ELEMENT WITH UTILIZATION CIRCUIT

Herbert Weiss, Nurnberg, Germany, assignor to Siemens-Schuckertwerke Aktiengesellschaft, Berlin-Siemensstadt, Germany, a corporation of Germany Filed Nov. 10, 1954, Ser. No. 468,099

Claims priority, application Germany Nov. 11, 1953

14 Claims. (Cl. 307—88.5)

My invention concerns electric semiconductor devices and, in a more particular aspect, devices in which a semiconductor traversed by electric current is subjected to a magnetic field, and the resulting difference in potential between two Hall electrodes of the semiconductor device is utilized for measuring, controlling, regulating, modulating or other translating purposes. In this respect my invention is generally related to the disclosure in my copending application Serial No. 391,647, filed November 12, 1953, Patent No. 2,906,945 and assigned to the assignee of the present invention.

It is an object of my invention to provide a semiconductor device capable of producing a Hall voltage and power output greatly exceeding the output heretofore obtainable from devices of this kind.

Another object, akin to the one mentioned, is to make such a device suitable for operations that require placing a current load upon the output circuit of the semiconductor device, so as to make the device applicable for the direct control of apparatus that, because of appreciable power-input requirements, heretofore necessitated adding a pre-amplifier with a high-ohmic input stage, as has been the case with various measuring instruments such as oscillographs, or such power-input consuming translating apparatus as relay amplifiers, magnetic amplifiers, transistor amplifiers, amplifying dynamos, or the power stages of electronic-tube amplifiers.

Still another object of my invention is to devise a semiconductor device capable of furnishing such large voltages and power outputs with the aid of magnetic fields of no higher field strength than obtainable with permanent magnets or electromagnets of the generally available types.

To achieve these objects, and in accordance with a feature of my invention, a group of semiconductors are each equipped with a pair of Hall electrodes and are all subjected to a magnetic field so that the field strength values in the respective semiconductors have a fixed ratio relative to each other or are equal to each other at any time. These semiconductors are connected to a current supply so as to be simultaneously traversed by current whose magnitudes in the respective semiconductors also have a fixed ratio or are equal to each other. The pairs of Hall electrodes are all connected to a common output means in voltage-cumulative relation to each other so that the resultant output of the device is proportional to the sum of the respective Hall voltages occurring between the pairs of electrodes. In this organization, either the current supplied, or the effect of the magnetic field upon the semiconductors, or both are variable for controlling the output of the device.

According to another, more specific feature of my invention, the semiconductors of the above-mentioned group are individually provided with two terminals for connection to the source of current supply, and each of these semiconductors is connected in a branch circuit in series with magnetically not affected resistance means, the respective branch circuits being connected to a common source of current supply in parallel relation to each other; and the pairs of Hall electrodes of the semiconductors are all connected in series to form part of a common output circuit.

According to another, alternative feature of my invention, the semiconductors of the group are all connected in a single supply circuit in series relation to each other, and the respective pairs of Hall electrodes are connected in mutually insulated electric circuits that are inductively linked with each other by a magnetizable core to produce therein a resultant, cumulative magnetic induction.

According to a further feature, more specific than the one last mentioned, two or more of the series-connected semiconductors are combined to form a single semiconductor body with mutually spaced pairs of Hall electrodes, the respective pairs being connected in separate circuits which are electrically insulated from each other but inductively interlinked as mentioned above.

According to still another feature of the invention, applying to each of those aforementioned, each semiconductor of the group consists of a semiconductive compound of a carrier mobility of about 6000 cm.$^2$/volt second or more, preferably of a compound of the type $A_{III}B_V$ as explained in a later place.

The foregoing and other objects, advantages and features of the invention will be apparent from the following description in conjunction with the drawings, in which—

The same reference characters are applied in the various illustrations for respectively similar elements.

Figure 1:
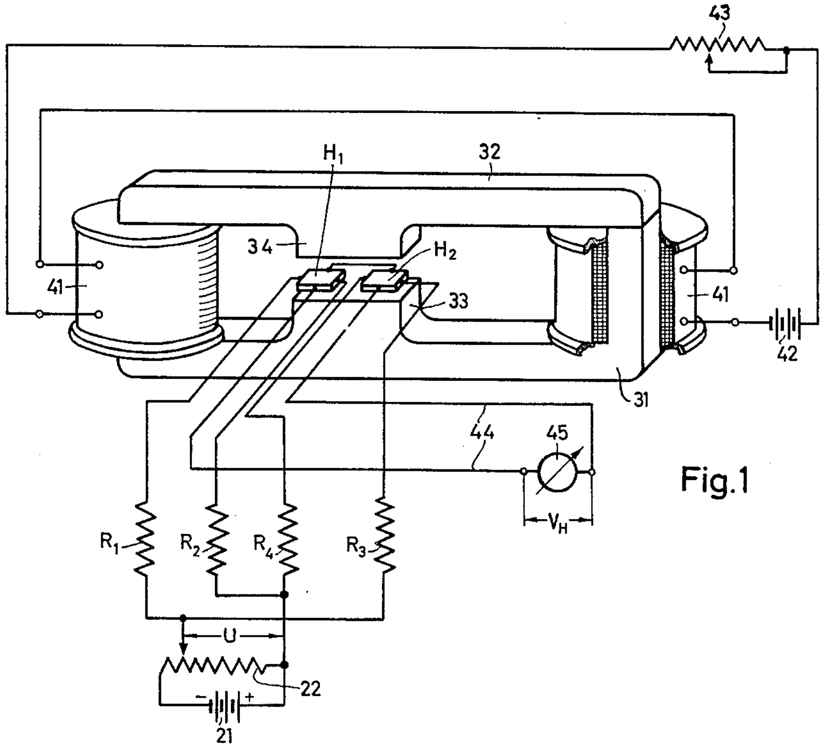
FIG. 1 shows schematically and partly in section a device according to the invention in conjunction with its electric circuit connections.
Figure 2:
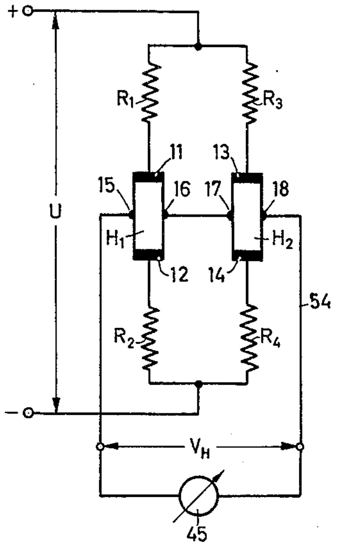
FIG. 2 illustrates separately the circuit diagram of a portion of the same device.

The device illustrated in FIGS. 1 and 2 is shown provided with two semiconductor members $H_1$ and $H_2$, although, as described below, a larger number of such members may be used. Each of the two semiconductor members comprises a resistance body of a crystalline compound, for instance a mono-crystal of indium arsenide, and has the shape of a rod or plate of a few square millimeters cross section. Each semiconductor body is equipped with two terminals 11, 12 or 13, 14 for connection of the semiconductor into a current-supply circuit. Each semiconductor member is further equipped with a pair of Hall electrodes 15, 16 or 17, 18 located between the current supply terminals so that the electrodes of each pair lie on an equipotential surface when the semiconductor is not subjected to a magnetic field.

The semiconductor member $H_1$ lies in a branch circuit in series with two resistors $R_1$ and $R_2$. The semiconductor member $H_2$ is similarly connected in a branch circuit in series with two resistors $R_3$ and $R_4$. Current is supplied to the parallel connected branch circuit from a source of adjustable or variable voltage U represented by a constant-voltage source 21 and a potentiometer rheostat 22. The two semiconductor members $H_1$ and $H_2$ have equal resistance. The resistors $R_1$ to $R_4$ have equal resistance among themselves, this resistance being, for instance, five times larger than that of the individual members $H_1$ and $H_2$. The resistors $R_1$ to $R_4$ may consist of any ohmic type. However, they may also consist of the same semiconductor material as the members $H_1$ and $H_2$, except that the resistors $R_1$ to $R_4$ are not provided with Hall electrodes and are not subjected to a magnetic field as are the members $H_1$ and $H_2$.

The semiconductor members $H_1$ and $H_2$ are disposed within a magnetic field produced by an electromagnet whose core is composed of two parts 31 and 32. Each part forms a pole shoe 33 or 34. For lucidity of illustration, the pole shoes are shown to be spaced from the semiconductor members $H_1$ and $H_2$. Actually, however, we prefer covering the pole face of each pole shoe by a thin coating of electrically insulating material which is in intimate contact with the semiconductor bodies of members $H_1$ and $H_2$. The coatings may consist of ferrite material which is electrically insulating but magnetically conductive so that there is no gap between the magnet system and the semiconductor members. The magnet structure carries excitation coils 41 which are connected in a circuit energized from a source 42 through a current control member represented by a rheostat 43. The two pairs of Hall electrodes are serially connected in an output circuit 44 for energizing a load 45 here represented by a millivoltmeter.

When the two semiconductor members $H_1$ and $H_2$ are traversed by current and the magnetic field has zero value, the Hall electrodes 15 to 18 have all the same potential so that no voltage is impressed upon the instrument 45. When a magnetic field is applied by energizing the magnet coils 41, a voltage difference, the so-called Hall voltage, appears between the electrodes 15 and 16; and such a voltage also appears between the electrodes 17 and 18. This voltage is dependent upon the magnitude of the current flowing through the semiconductor device and hence upon the supply voltage U, and is also dependent upon the strength and orientation of the magnetic field, namely upon the strength of the field component perpendicular to the flow direction of the current in the respective semiconductor members. In the device illustrated in FIG. 1, the entire field in each of members $H_1$ and $H_2$ is always perpendicular to the current flow. Consequently, the resultant Hall voltage $V_H$ in the output circuit of the device depends upon the value of voltage U and upon the excitation of the magnet system i.e., upon the current flowing in the circuit of coils 41. For instance, when the rheostat 43 is set to provide a given excitation current, while the voltage U is variable, then the output voltage $V_H$ is controlled in dependence upon the variations of the voltage U. Similarly, for any given voltage U, the output voltage $V_H$ can be controlled by applying variable excitation to the magnet system.

Figure 3:
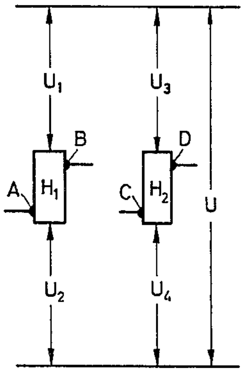
FIGS. 3 and 4 are explanatory voltage diagrams relating to the embodiment of FIGS. 1 and 2.
Figure 4:
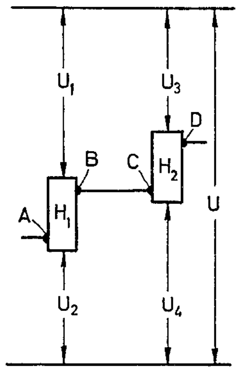

FIG. 3 serves to indicate the voltage division occurring in the magnetic field, it being assumed that the pairs of Hall electrodes of the respective $H_1$ and $H_2$ are disconnected from each other. When current is flowing through the two members $H_1$ and $H_2$ while the magnetic field acting upon them has a finite value, the total voltage in the branch circuit of member $H_1$ is divided into three voltage drops, namely a voltage drop $U_1$ occurring in the resistor $R_1$, a voltage drop $U_2$ occurring in the resistor $R_2$, and a voltage drop in member $H_1$. At the same time the two Hall electrodes of member $H_1$ assume different potentials as schematically indicated by the points of potential A and B. The voltage conditions in the branch circuit of member $H_2$ are similar, and the two Hall electrodes of members $H_2$ assume different potentials C and D respectively. For obtaining the sum of the two Hall voltages A—B and C—D, the potentials B and C must be made equal by interconnecting the two respective electrodes. This results in an increase of a few percent in voltage drop of resistors $R_1$ and $R_4$ and a corresponding reduction of the voltage drop in resistors $R_2$ and $R_3$. The voltage distribution thus obtained is schematically illustrated in FIG. 4. The resultant output voltage $V_H$ thus is the sum of the respective Hall voltages occurring across the two pairs of Hall electrodes. It will be recognized that if the electrodes at A and C are connected with each other, the difference of the individual Hall voltages will appear between points B and C.

Figure 10:
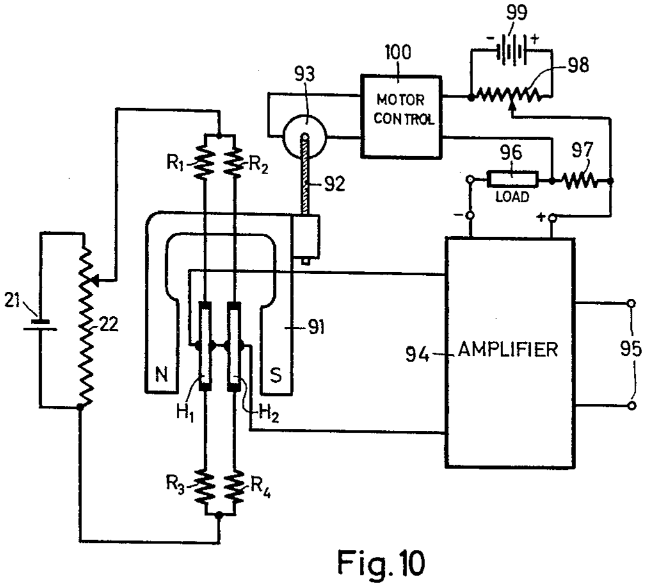
FIG. 10 shows schematically the circuit diagram of a feed-back control system according to the invention.

While in the example of FIG. 1, the two semiconductor members are disposed in magnetic parallel relation relative to the field acting upon them, they may also be disposed in magnetic series relation (see FIG. 10). Furthermore, while the two semiconductor members are shown parallel connected relative to the current supply, they may also be series connected. It is further within the scope of the invention to impose upon the group of semiconductor members a magnetic control by varying the relative position between the group and the effective zone of the magnetic field, or by changing the relative angular orientation between the semiconductor group and the field. Before describing embodiments incorporating the just-mentioned features, it appears proper to further explain the operation of the device as well as the requirements to be met by the semiconductor members for achieving the desired results.

For any given condition of magnetic field strength, power supply in the primary electric circuit of the semiconductor, geometric dimensions and charge-carrier concentration, the Hall voltage generated in the semiconductor increases with the carrier mobility of the substance used for the semiconductor. Hence, if the Hall voltage to be generated is to have a practically useful order of magnitude with magnetic field strengths within the practically realizable limits, the carrier mobility must have a correspondingly high value.

For that reason, the invention requires the use of semiconductor substances with a carrier mobility of at least about 6000 $cm.^2$/volt second, preferably 10,000 $cm.^2$/volt second or more.

"Carrier mobility" is defined as the velocity of the electric charge carriers within the semiconductive substance in centimeters per second in an electric field of one volt per centimeter. One and the same semiconductor substance may exhibit (n-type) conductance by excess electrons or negative carriers, or (p-type) conductance by defect-electrons (holes) or positive carriers, depending upon the preparative treatment applied to the substance. The type of conductance depends particularly on the choice of small traces of substitutional impurities that are added to, or contained in, the substance and cause lattice defects, i.e. disturb the perfection of the valence-bond structure. The term "carrier mobility" or "mobility" as used herein is generic to both types of conductance, it being only essential that either the electron mobility or the hole mobility of the semiconductive compound be about 6000 $cm.^2$/volt second or more. The reason why such a minimum of carrier mobility is required will be understood from the following.

When, in a semiconductor, an electron carrying an electric charge $e$ and having a carrier mobility $\mu$ is subjected to an electric field E as produced by the flow of current through the semiconductor, then the electron is subjected to the force $K_{el}=eE$. Under the effect of this force, the electron moves at a velocity $v=\mu E$. If this electron is also subjected to a magnetic field H directed perpendicularly to the electric field, then an additional force is imposed upon the electron perpendicularly to its original direction of motion. This additional force has the magnitude $$K_{magn}=evH=e\mu EH$$

The ratio of the two forces $K_{magn}/K_{el}$ becomes equal to $\mu$H.

If $$K_{magn}/K_{el}=\mu H \ll 1$$

that is, as long as the value $\mu H$ is of a smaller order of magnitude than unity, the magnetic effect upon the electric properties of the semiconductor is slight and negligible. On the other hand, this effect is considerable if $$K_{magn}/K_{el}=\mu H\approx 1$$

that is, when the magnetic force is of the same order of magnitude as the electric force so that the value $\mu H$ is approximately equal to unity.

Consequently, the value $\mu H=1$ represents a critical limit for the occurence of appreciable magnetic effects. The magnetic field in the foregoing consideration is measured in volt second/cm.$^2$ and the mobility in cm.$^2$/volt second.

Now, the magnetic field strengths readily obtainable with electromagnets are up to about 17,000 gausses while, because of the saturation properties of iron, field strengths larger than 17,000 gausses can be produced only with difficulty or at an unproportionately large expenditure. It follows that for securing magnetic effects of utilizable magnitude, the semiconductor must have a minimum mobility of about 6000 cm.$^2$/volt second, because 17,000 gausses is equal to 1.7. $10^{-4}$ volt second/cm.$^2$, so that $$\mu H=6000\times 1.7\times 10^{-4}\approx 1$$

The maximum field strength obtainable with the available permanent magnets is approximately 10,000 gausses. It follows that, when providing a device according to the invention with a permanent-magnet field, a minimum carrier mobility of about 10,000 cm.$^2$/volt second is required, because 10,000 gausses is equal to $10^{-4}$ volt second/cm.$^2$ so that $$\mu H=10,000\times 10^{-4}=1$$

It will be recognized that in view of the technically well applicable magnetic field strengths, a minimum carrier mobility of about 6000 or preferably 10,000 cm.$^2$/volt second is needed.

The elementary semiconductor substances heretofore used for transistors, namely silicon and germanium, do not have such a high carrier mobility, the best obtainable mobility, namely that of germanium, being about 3000 cm.$^2$/volt second. However, the required high carrier mobilities are available with semiconductive compounds.

A compound, in contrast to a homopolar element, has, aside from its homopolar component, also a heteropolar component due to the chemical difference in the lattice elements (in alkali halogenide crystals the homopolar component in even practically zero and only the ionized heteropolar component is present). The superposition of homopolar and heteropolar components results in an increase in bonding energy due to the so-called resonance strengthening. This has a favorable effect upon the carrier mobility in all those cases in which the heteropolar component of a compound is so weak that its detrimental influence upon the electron mobility is not yet noticeable while at the same time the strengthening of the bond by the resonance between the homopolar and heteropolar components is appreciable.

The foregoing applies especially to binary compounds of the type $A_{III}B_V$, that is to compounds of an element of the third group in the periodic system with an element of the fifth group. Such compounds are described in my copending application above mentioned, and also in the copending application of H. Welker for Semiconductor Devices and Methods of their Manufacture, Serial No. 275,785, filed March 10, 1952, issued as Patent Number 2,798,989, and assigned to the assignee of the present invention. The compounds of the $A_{III}B_V$ type comprise those of an element selected from boron, aluminum, gallium and indium with an element selected from nitrogen, phosphorus, arsenic and antimony. Examples of such compound are: AlN, AlP, AlAs, AlSb, GaN, GaP, GaAs, GaSb, InP, InAs, InSb, Bp. The semiconductor bodies made of these compounds may contain extremely slight traces of substitutional impurities. As a rule, for instance, a trace of tellurium or selenium produces n-type conductance, and a trace of cadmium, zinc or magnesium produces p-type conductance in $A_{III}B_V$ compounds. Especially notable among these compounds are InSb and InAs, both having carrier mobilities above 20,000 cm.$^2$/volt second.

Due to the high carrier mobility, the Hall voltage attains the order of magnitude of 0.1 volt, and since the interior resistance of each "Hall generator" member, i.e. the resistance between the Hall electrodes of each individual semiconductor is small, the relatively large power output desired for the purposes of the invention is secured. For instance, in a device according to the invention, equipped with InSb semiconductors, each 10 mm. long, 5 mm. wide and 0.5 mm. thick, a Hall voltage of 103 mv. and a power output of 5.3 mw. was obtained from the individual semiconductor member, when passing through the member a current of 200 ma. and subjecting it to a magnetic field of 10,000 gausses. In the same device, but equipped with InAs semiconductors having a length of 15 mm. a width of 8 mm. and a thickness of 0.1 mm., the application of a primary current of 1.2 amperes and a magnetic field of 10,000 gausses resulted in a Hall voltage of 1.2 v. and a Hall power output of 100 mw. for the individual semiconductor.

Another advantage of the high carrier mobility lies in the relatively good efficiency, i.e. the ratio of power output to power input, of such a "Hall generator." This efficiency is proportional to the square of the product of carrier mobility times magnetic field strength. For instance, with an indium antimonide semiconductor in a magnetic field of 10,000 gausses as mentioned above, an efficiency above 20% was attained.

The current supply terminals as well as the Hall electrodes are preferably joined with the semiconductor bodies by soldering. Clamping the terminals and electrodes to the semiconductor body is less preferable and is suitable only for small current outputs. We found it advantageous to first electrolytically deposit a thin metal coating for instance of copper or nickel, upon the proper places of the semiconductor bodies. The supply and electrode wires can then be attached to the coating by ordinary soldering with tin. Soldering with the aid of ultrasonics has also been found useful for some semiconductor materials.

Figure 5:
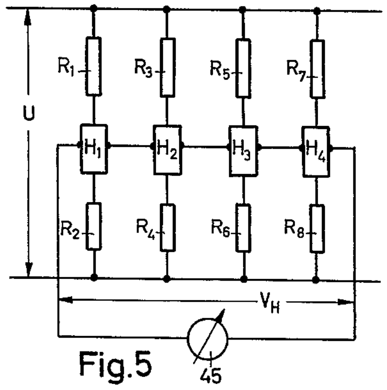
FIGS. 5 and 6 shows schematically two modifications respectively of a device involving the same principle as that shown in FIGS. 1 to 4.
Figure 6:
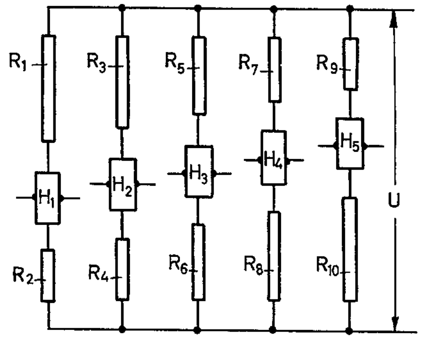

The number of individual semiconductor members of the group is chosen in accordance with the desired voltage and power output of the device. As shown in FIG. 5, a number of individual semiconductor members can be connected to a Hall cascade. The illustrated embodiment shows a group or stack of four semiconductor members $H_1$ to $H_4$ in connection with resistors $R_1$ through $R_8$, it being understood that the members $H_1$ to $H_4$ form part of an apparatus otherwise designed in accordance with the principle of FIG. 1 (or FIG. 10). Hall voltage and power output are equal to the sum of the individual Hall voltages and power outputs, and it is thus possible to provide a resultant Hall voltage $V_H$ up to 50% of the applied voltage U. However, if the operating conditions to which the device is to be applied are such that the output voltage (Hall voltage) has normally a given level and varies only slightly toward higher and lower values, then the resistors are preferably rated in accordance with the voltage-distribution diagram shown in FIG. 6. That is, the resistors $R_1$, $R_3$, $R_5$, $R_7$ and $R_9$ are given progressively higher ratings and the resistors $R_2$, $R_4$, $R_6$, $R_8$ and $R_{10}$ are given progressively lower resistance ratings to obtain the voltage distribution apparent from the diagram. With the aid of such a device a resultant Hall voltage $V_H$ can be obtained which departs only little from the applied voltage U.

Figure 9:
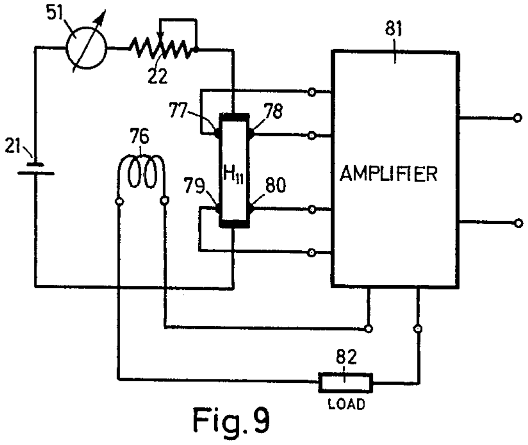
FIG. 9 illustrates an embodiment similar to that of FIG. 8 but involving a feed-back coupling.

As mentioned, the Hall-electrode circuits of the individual semiconductor members may be connected in separate circuits that are electrically insulated from each other but operate in the cumulative sense upon a common member to be controlled. For instance, the individual Hall electrode circuits may be connected to several control windings of a magnetic amplifier, to separate primary windings of a transformer, or to separate control windings of an amplifying dynamo. As a result, the semiconductor members of the group may be connected in series. It is then also possible to combine the semiconductors of the group into a single semiconductor body with a plurality of Hall-electrode pairs normally located at different equipotential surfaces so that the pairs are spaced from each other along the current-flow direction of the semiconductor body. Embodiments of this type are illustrated in FIGS. 7 to 9.

Figures 7, 8:
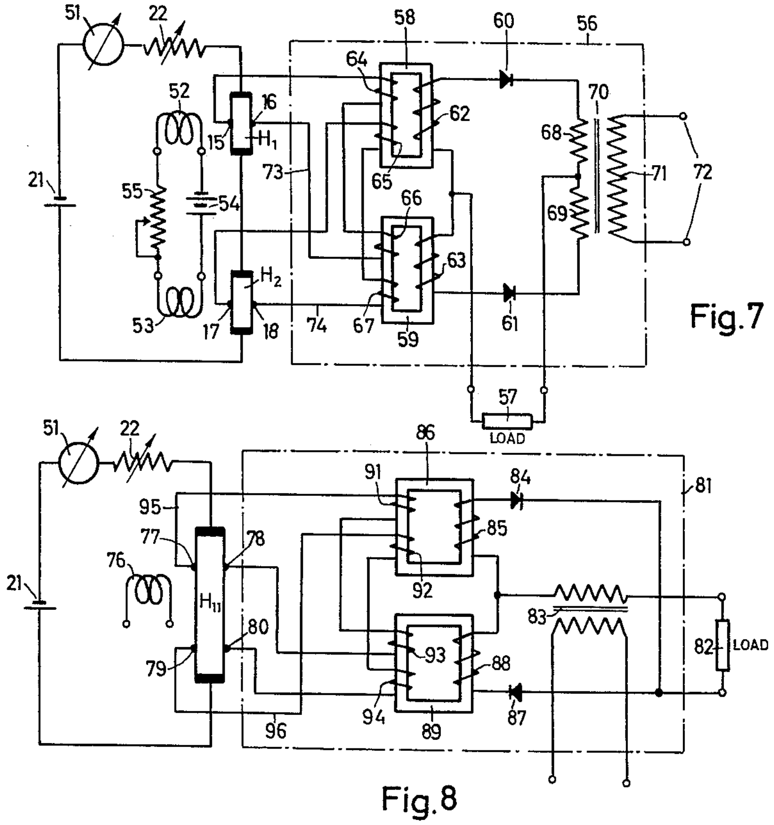
FIGS. 7 and 8 illustrate the circuit diagram of two other embodiments of the invention involving a combination of a semiconductor device with a magnetic amplifier.

In the embodiment shown in FIG. 7, a semiconductor device according to the invention forms the input stage of a magnetic amplifier. The device comprises two semiconductor members $H_1$ and $H_2$ with respective pairs of Hall electrodes 15, 16 and 17, 18. In contrast to the embodiments previously described, the two members $H_1$ and $H_2$ are connected in series so that they are traversed by the same current from a source 21. The current is adjustable by means of a rheostat 22. The energizing circuit is shown to comprise an instrument 51 for permitting the current to be set to a desired magnitude, whereafter the control of the semiconductor members is effected by variations in the magnetic field to which they are subjected. The magnetic field device is schematically represented by two excitation coils 52, 53 energized from a source 54, through a rheostat 55. The excitation may be controlled in response to a variable condition under observation.

The Hall voltages occurring between the electrodes 15, 16 and between the electrodes 17, 18 are cumulatively applied to the magnetic amplifier 56 which serves to supply controlled direct current to a load 57 from an alternating-current line. The amplifier has two saturable reactors 58, 59 and two half-wave rectifiers 60 and 61. The reactors 58, 59 have respective main windings 62, 63 and are each equipped with two cumulatively poled control windings 64, 65 and 66, 67. The reactor main windings 62 and 63 are connected through the respective rectifiers 60 and 61 to secondary windings 68 and 69 of a transformer 70 whose primary 71 is energized from alternating-current line terminals 72. The load 57 has one terminal connected to the midpoint between the transformer secondary windings 68 and 69. The other terminal of load 57 is connected to a circuit point between the reactor main windings 62 and 63. The rectified current passing through the load 57 depends upon the effective reactance of windings 62 and 63 which in turn is controlled by the direct-current premagnetization supplied by the control windings 64, 65 and 66, 67. The windings 64 and 66 are connected in a Hall-voltage circuit 73 which receives voltage from across the electrodes 15 and 16 of the semiconductor member $H_1$. The windings 65 and 67 are connected in a separate circuit 74 which is electrically insulated from the circuit 73 and is impressed by the Hall voltage generated between the electrodes 17 and 18 of semiconductor member $H_2$. During the operation of the apparatus, the current supplied to the load 57 is controlled in dependence upon the selected or condition-responsive excitation of the magnetic field acting upon the semiconductor members.

In the embodiment of FIG. 8, the semiconductor device is shown to have a single semiconductor structure $H_{11}$ traversed by current from source 21 under control by rheostat 22. The magnetic field acting upon the semiconductor structure $H_{11}$ is schematically represented by a magnet coil 76. The structure $H_{11}$ is in effect a combination of two semiconductor members in series and, accordingly, is provided with two pairs of Hall electrodes 77, 78 and 79, 80. These electrode pairs are located at different levels of electric potential, that is they are spaced from each other along the direction of current flow.

The magnetic amplifier 81 exemplified in the embodiment of FIG. 8 serves for supplying controllable alternating current to a load 82 through a transformer 83. The load 82 has one terminal connected to one end of the transformer secondary winding. The other load terminal is connected to the other end of the secondary winding through two parallel circuit branches. One branch includes a half-wave rectifier 84 and the main winding of a saturable reactor 86. The other branch includes another half-wave rectifier 87 and the main winding 88 of another saturable reactor 89. The rectifiers 84 and 87 are poled in mutually opposed sense so that one branch conducts current during only one half wave and the other branch conducts current during the other half wave of the secondary transformer voltage.

The reactor 86 has two premagnetizing control windings 91, 92 and the reactor 90 has two corresponding control windings 93 and 94. Windings 91 and 93 are connected in a circuit 95 energized from across the Hall electrodes 77 and 78. The windings 92 and 94 lie in another circuit 96 which receives Hall voltage from the electrodes 79 and 80. The operation of the apparatus is basically similar to that of FIG. 7.

It will be understood that the particular amplifier details shown in FIGS. 7 and 8 are presented only by way of example and are not essential to the invention proper. It will further be apparent that the mutually insulated Hall-voltage circuits may be inductively linked with the core of various other inductive devices, as mentioned in the foregoing. When operating the current supply circuit of the semiconductor device with alternating current, the Hall voltage output is likewise alternating so that it may serve to control a transformer.

FIG. 9 illustrates an example of the use of a device according to the invention for the purpose of regulation. The semiconductor device and its connection to an amplifier correspond to FIG 8 and hence need not be further described. The device serves for regulating the current in load 82 for constancy. For this purpose the output circuit of the amplifier 81 is connected with the excitation winding 76 of the magnet system to whose magnetic field the semiconductor structure $H_{11}$ is subjected. The resulting feed-back coupling has the effect of controlling the Hall voltage input to the amplifier 81 in the sense required to maintain a constant load current.

The embodiment of FIG. 10 exemplifies the provision of a permanent magnet for producing the magnetic field in the semiconductor device and also shows another possibility of feed-back control. The semiconductor device comprises a group of parallel connected semiconductor members $H_1$, $H_2$ energized and connected in the same manner as described with reference to FIGS. 1 to 6, it being understood that more than two semiconductor members may be provided. The semiconductor members are disposed within the field of a permanent magnet 91 which can be displaced relative to the group of members by means of a spindle 92 driven from a reversible motor 93. The resultant Hall voltage supplied to the amplifier 94 thus depends upon the relative position of semiconductor group and magnet. The amplifier is supplied with power through terminals 95 and energizes a load 96. A resistor 97 in the load circuit provides a voltage drop proportional to the load current. This voltage drop is compared with a reference voltage taken from across the tapped-off portion of a rheostat 98 energized from a current source 99. The resultant differential voltage is applied through suitable motor control means to cause the motor 93 to run in one or the other directions when the load-responsive voltage across resistor 97 departs in one or the other sense from the reference voltage. This system operates to regulate the load current in accordance with a desired constant value determined by the setting of the rheostat 98; and it will be understood that it may be also used for positional control movable structure.

In the semiconductor device according to FIG. 10 the members of the semiconductor group are all in series relative to the magnetic field. Such a magnetic series arrangement is also applicable in conjunction with all other embodiments. While the magnetic control in the device of FIG. 10 is effected by displacing the field relative to the semiconductors in a direction parallel to the current flow, it will be apparent that the control may also be effected by changing the angular position or field and semiconductor group relative to each other. Furthermore, instead of displacing the magnet structure, it may be kept fixed while the group of semiconductors is moved accordingly.

It will be recognized from the embodiments described in the foregoing that a semiconductor device according to the invention may be controlled by several variable input magnitudes. For instance, one control magnitude can be applied by varying the current intensity in the primary supply circuit of the semiconductor members. A second control magnitude can be applied by varying the strength of the magnetic field. A third control magnitude can be made effective by varying the position of the semiconductor group relative to the effective field zone of the magnet; and if a fourth control magnitude is to be effective it may act to vary the relative angular orientation of semiconductor group and magnetic field. If a lesser number of controlling magnitudes is to be effective, then any desired smaller number of the above-mentioned four control possibilities may be chosen, depending upon the requirements of the particular application.

It will be apparent to those skilled in the art upon a study of this disclosure that the invention permits of various modifications and uses other than those specifically set forth, without departing from the essence of the invention and within the scope of the claims annexed hereto.

I claim:

1. An electric device, comprising direct current-supply means, a plurality of circuit branches connected with said current supply means in parallel relation to each other, each of said branches comprising a semiconductor member of magnetically responsive conductance and two resistors, said member having a minimum carrier mobility of about 6000 cm.$^2$/volt second and being connected between and in series with said two resistors, said two resistors having substantially equal resistance and having each a pair of Hall electrodes, said resistors having substantially equal resistances individually larger than the resistance of one of said members, a magnetic-field means having substantially the same field strength in each of said members in a direction transverse to the current flow in said members whereby a Hall voltage is produced between the two electrodes of each of said pairs, and an output circuit, said electrode pairs being connected in said output circuit in series relation to each other.

2. A Hall-voltage generating device, comprising a group of elongated semiconductor members of magnetic-field responsive resistance, each member having a minimum carrier mobility of about 6000 cm.$^2$/volt second and having a pair of Hall electrodes, said members being of similar shape and similar resistance and being disposed adjacent and parallel to each other, a direct current supply circuit having parallel branches each including one of said members and resistance means in series with said one member, said resistance means having a resistance larger than that of said member and substantially equal to the resistance of the resistance means in each other branch, the current passing lengthwise of each member, field means for producing a magnetic field passing transversely and serially across the members, said resistance means in each branch comprising two magnetically not affected resistors between which the semiconductor member of the branch is connected, said group of members being disposed in said field so as to generate a Hall voltage between the electrodes of each of said pairs, an output circuit including said electrode pairs in series with each other to provide an output voltage equal to the sum of said Hall voltages, and one of said current supply means and field means being variable for controlling said output voltage.

3. The apparatus of claim 2, the semiconductor members each comprising an indium arsenide mono-crystal.

4. A Hall-voltage generating device, comprising a group of elongated semiconductor members of magnetic-field responsive resistance, each member having a minimum carrier mobility of about 6000 cm.$^2$/volt second and having a pair of Hall electrodes, said members being of similar shape and similar resistance and being disposed adjacent and parallel to each other, a direct current supply circuit having parallel branches each including one of said members and resistance means in series with said one member, said resistance means having a resistance larger than that of said member and substantially equal to the resistance of the resistance means in each other branch, the current passing lengthwise of each member, field means for producing a magnetic field passing transversely and serially across the members, said resistance means in each branch comprising two magnetically not affected resistors between which the semiconductor member of the branch is connected, said group of members being disposed in said field so as to generate a Hall voltage between the electrodes of each of said pairs, an output circuit including said electrode pairs in series with each other to provide an output voltage equal to the sum of said Hall voltages, amplifier means connected in said output circuit, load means electrically connected for actuation by the amplifier means, and means responsive to a parameter variation in the output current passed through the load means to vary the magnetic field effective upon the semiconductor members.

5. A semiconductor magnetic-field responsive resistance device for producing a Hall voltage, comprising magnetic field structure having a field gap, a group of elongated resistor plate members of semiconductor material, each member having two current terminals at its respective longitudinally opposite ends, each of said members having mutually opposite large area faces, mutually opposite, lengthwise-directed, side edges, and mutually opposite end edges, said members being disposed with their respective side edges facing each other within said gap and with their opposite large area faces respectively substantially aligned in two opposite planes that are transverse to the direction of the magnetic field, the side edges being in spaced relation to each other, whereby the ends of adjacent members are insulated from each other, the magnetic flux of the field structure passing through the large area faces of the several members in parallel, adjacent members being interconnected intermediately of the current terminal ends, transversely of the large area faces, to provide serial connection of the Hall voltages produced by the respective members, two current supply leads between which each member is connected at its respective current terminal ends in parallel relation to said other members, and ohmic resistance means in series with the several semiconductor members, the ohmic resistance means being connected between the respective current supply lead and the corresponding current terminal ends of the several semiconductor members, the device providing a plurality of parallel circuit branches each of which is constituted by one of said plate members and two of said resistance means, the plate member being connected between said two resistances, the sum of the resistances in each branch being substantially equal and being greater than the resistance of the semiconductor of that branch, one of said magnetic field and said current supply to the supply leads being subject to variable control independently of the other for simultaneously varying said Hall voltages.

6. A semiconductor magnetic-field responsive resistance device for producing a Hall voltage, comprising magnetic field structure having a field gap, a group of elongated resistor plate members of semiconductor material, each member having two current terminals at its respective longitudinally opposite ends, each of said members having mutually opposite large area faces, mutually opposite, lengthwise-directed, side edges, and mutually opposite end edges, said members being disposed with their respective side edges facing each other within said gap and with their opposite large area faces respectively substantially aligned in two opposite planes that are transverse to the direction of the magnetic field, the side edges being in spaced relation to each other, whereby the ends of adjacent members are insulated from each other, the magnetic flux of the field structure passing through the large area faces of the several members in parallel, adjacent members being interconnected intermediately of the current terminal ends, transversely of the large area faces, to provide serial connection of the Hall voltages produced by the respective members, two current supply leads between which each member is connected at its respective current terminal ends in parallel relation to said other members, and ohmic resistance means connected in series with the semiconductor members, being connected between each of the said current supply leads and the semiconductor members, the device providing a plurality of parallel circuit branches each of which is constituted by one of said plate members and two of said resistance means, the plate member being connected between said two resistances, the sum of the resistances in each branch being substantially equal and being greater than the resistance of the semiconductor of that branch, one of said magnetic field and said current supply to the supply leads being subject to variable control independently of the other for simultaneously varying said Hall voltages.

7. A semiconductor magnetic-field responsive resistance device for producing a Hall voltage, comprising magnetic field structure having a field gap, a group of elongated resistor plate members of semiconductor material, each member having two current terminals at its respective longitudinally opposite ends, each of said members having opposite large area faces, the magnetic flux of the field structure passing through the large area faces of the several members, adjacent members being interconnected intermediately of the current terminal ends, transversely of the large area faces, to provide serial connection of the Hall voltages produced by the respective members, two current supply leads between which each member is connected at its respective current terminal ends in parallel relation to said other members, and ohmic resistance means connected in series with the semiconductor members between each of the said current supply leads and the semiconductor members the device providing a plurality of parallel circuit branches each of which is constituted by one of said plate members and two of said resistance means, the plate member being connected between said two resistances, the sum of the resistances in each branch being substantially equal and being greater than the resistance of the semiconductor of that branch, one of said magnetic field and said current supply to the supply leads being subject to variable control independently of the other for simultaneously varying said Hall voltages.

8. An electric device having a Hall effect voltage with a substantial power output applicable for the direct control of apparatus having substantial power-input control requirements, comprising direct current supply means and a plurality of circuit branches connected with said current supply means in parallel relation to each other, each of said branches comprising semiconductor means formed of a crystalline binary semiconductor compound having a minimum carrier mobility of about 6000 cm.$^2$/volt second, said compound being a compound of an element selected from the group consisting of boron, aluminum, gallium, and indium, with an element selected from the group consisting of nitrogen, phosphorus, arsenic, and antimony, in atomic proportions of one to one, each of said semiconductor means having a pair of Hall electrodes, each branch further comprising two magnetically not affected resistance means in series with said semiconductor means and the current supply means, the semiconductor means of each branch being connected between the two resistors of that branch, each of said resistance means having a resistance which is a multiple of that of the semiconductor means, the sum of the said resistance means in each branch being substantially equal, field means for producing a magnetic field, said semiconductor means being disposed in said field and having the flow direction of said current extend transverse to the direction of said field to generate a plurality of respective Hall voltages at each of said respective electrode pairs, said current supply means and magnet means being subject to variable control independently of the other for simultaneously varying said Hall voltages, and a single power output means to which said plurality of electrode pairs are connected in voltage-cumulative relation to each other.

9. An electric device, comprising a plurality of circuit branches each having two magnetically not affected resistance means and each having a semiconductor crystalline member connected in series with and between said two resistance means of the respective branch, each of said members being formed of a semiconductor compound having a minimum carrier mobility of about 6000 cm.$^2$/volt second, said compound being a compound of an element selected from the group consisting of boron, aluminum, gallium, and indium, with an element selected from the group consisting of nitrogen, phosphorus, arsenic, and antimony, in atomic proportions of one to one, each member having a pair of Hall electrodes, current supply means, said branches being connected with said current supply means in parallel relation to each other, the current through the members being direct current, each of said resistance means of each branch having a greater resistance than the corresponding member of the respective branch, the sum of the said resistance means in each branch being substantially equal, magnetic-field means having a field traversing said members in a direction transverse to the current flow in said members whereby a Hall voltage is produced between the electrodes of each of said pairs, said current supply means and magnet means being subject to variable control independently of the other for simultaneously varying said Hall voltages, and an output circuit, said electrode pairs being connected in said output circuit in voltage-cumulative, series relation to each other.

10. An electric device, comprising current supply means, a plurality of circuit branches connected with said current supply means in parallel relation to each other, each of said branches comprising a crystalline semiconductor member formed of a semiconductor compound of magnetically responsive conductance having a minimum carrier mobility of about 6000 cm.$^2$/volt second and two magnetically not affected resistors, said compound being a compound of an element selected from the group consisting of boron, aluminum, gallium, and indium, with an element selected from the group consisting of nitrogen, phosphorus, arsenic, and antimony, in atomic proportions of one to one, the sum of the resistances of the resistors of each branch being substantially equal and being a multiple of the resistance of the semiconductor member of the respective branch, said member of each branch being connected between and in series with said two resistors of that branch, each of said semiconductor members having a pair of Hall electrodes, magnetic-field means having a field traversing said members in a direction transverse to the current flow in said members whereby a Hall voltage is produced between the two electrodes of each of said pairs, said current supply means and magnet means being subject to variable control independently of the other for simultaneously varying said Hall voltages, and an output circuit including said electrode pairs in voltage-cumulative series connection with each other.

11. An electric device, comprising current supply means, a plurality of circuit branches connected with said current supply means in parallel relation to each other, each of said branches comprising a crystalline semiconductor member formed of a semiconductor compound of magnetically responsive conductance having a minimum carrier mobility of about 6000 cm.$^2$/volt second and two magnetically not affected resistors, said compound being a compound of an element selected from the group consisting of boron, aluminum, gallium, and indium, with an element selected from the group consisting of nitrogen, phosphorus, arsenic, and antimony, in atomic proportions of one to one, the sum of the resistances of the resistors of each branch being substantially equal and being a multiple of the resistance of the semiconductor member of the respective branch, said member of each branch being connected between and in series with said two resistors of that branch, each of said semiconductor members having a pair of Hall electrodes, magnetic-field means having a field traversing said members in a direction transverse to the current flow in said members whereby a Hall voltage is produced between the two electrodes of each of said pairs, said current supply means and magnet means being subject to variable control independently of the other for simultaneously varying said Hall voltages, and an output circuit including said electrode pairs in voltage-cumulative series connection with each other, said respective circuit branches having substantially the same resistance, said respective semiconductor members having substantially equal resistance, the resistors located at one side of said members having progressively larger resistance from branch to branch, the resistors located at the other side of said members having progressively smaller resistance from branch to branch, the total resistance of the two resistors in each branch being larger than the resistance of said individual members, and said magnetic-field means having substantially the same field strength in each of said members.

12. The apparatus of claim 2, the semiconductor members being formed of a mono-crystal of a binary semiconductor compound, said compound being a compound of an element selected from the group consisting of boron, aluminum, gallium, and indium, with an element selected from the group consisting of nitrogen, phosphorus, arsenic, and antimony, in atomic proportions of one to one.

13. An electric device having a Hall effect voltage with a substantial power output applicable for the direct control of apparatus having substantial power-input control requirements, comprising direct current supply means and a plurality of circuit branches connected with said current supply means in parallel relation to each other, each of said branches comprising semiconductor means formed of the semiconductor compound InAs having a minimum carrier mobility of about 6000 cm.$^2$/volt second, each branch further comprising two magnetically not affected resistance means in series with said semiconductor means and the current supply means, the semiconductor means of each branch being connected between the two resistors of that branch, each of said resistance means having a resistance which is a multiple of that of the semiconductor means, the sum of the said resistance means in each branch being substantially equal, field means for producing a magnetic field, said semiconductor means being disposed in said field and having the flow direction of said current extend transverse to the direction of said field to generate a plurality of respective Hall voltages at each of said respective electrode pairs, said current supply means and magnet means being subject to variable control independently of the other for simultaneously varying said Hall voltage, and a single power output means to which said plurality of electrode pairs are connected in voltage-cumulative relation to each other.

14. An electric device, comprising current supply means, a plurality of circuit branches connected with said current supply means in parallel rotation to each other, each of said branches comprising a semiconductor member of magnetically responsive conductance having a minimum carrier mobility of about 6000 cm.$^2$/volt second and two magnetically not affected resistors, said semiconductor member being formed of the semiconductor compound InAs, the sum of the resistances of the resistors of each branch being substantially equal and being a multiple of the resistance of the semiconductor member of the respective branch, said member of each branch being connected between and in series with said two resistors of that branch, each of said semiconductor members having a pair of Hall electrodes, magnetic-field means having a field traversing said members in a direction transverse to the current flow in said members whereby a Hall voltage is produced between the two electrodes of each of said pairs, said current supply means and magnet means being subject to variable control independently of the other for simultaneously varying said Hall voltages, and an output circuit including said electrode pairs in voltage-cumulative series connection with each other.

References Cited in the file of this patent

UNITED STATES PATENTS

| | | |
|---|---|---|
| 2,545,369 | Millar | Mar. 13, 1951 |
| 2,550,492 | Millar | Apr. 24, 1951 |
| 2,553,490 | Wallace, Jr. | May 15, 1951 |
| 2,649,574 | Mason | Aug. 18, 1953 |
| 2,736,822 | Dunlap, Jr. | Feb. 28, 1956 |
| 2,798,989 | Welker | July 9, 1957 |